(12) United States Patent
Kanatzidis et al.

(10) Patent No.: US 7,727,506 B2
(45) Date of Patent: Jun. 1, 2010

(54) SEMICONDUCTING AEROGELS FROM CAHACOGENIDO CLUSTERS WITH BROAD APPLICATIONS

(75) Inventors: Mercouri G. Kanatzidis, Wilmette, IL (US); Santanu Bag, Evanston, IL (US)

(73) Assignee: Northwestern University, Evanston, IL (US)

(*) Notice: Subject to any disclaimer, the term of this patent is extended or adjusted under 35 U.S.C. 154(b) by 33 days.

(21) Appl. No.: 12/041,259

(22) Filed: Mar. 3, 2008

(65) Prior Publication Data

US 2008/0241050 A1    Oct. 2, 2008

Related U.S. Application Data

(60) Provisional application No. 60/892,980, filed on Mar. 5, 2007.

(51) Int. Cl.
*C01B 17/00* (2006.01)
*C01B 17/62* (2006.01)
*C01B 19/00* (2006.01)

(52) U.S. Cl. .................. 423/508; 423/511; 977/773; 977/775

(58) Field of Classification Search .............. 423/508, 423/511; 977/773, 775
See application file for complete search history.

(56) References Cited

U.S. PATENT DOCUMENTS 6,004,436 A   12/1999   Ayers 6,447,991 B1   9/2002   Daitch et al.
6,855,635 B2   2/2005   Schumacher et al.

OTHER PUBLICATIONS

"Hexagonal Pore Organization in Mesostructured Metal Tin Sulfides . . . " by K. K. Rangan et al., Nano Letters, vol. 2 No. 5, pp. 513-517, Mar. 19, 2002.*
"Importance of Solution Equilibria in the Directed Assembly of Metal Chalcogenide Mesostructures" S. Bag et al., J. Am. Chem. Soc., vol. 130 No. 26, pp. 8366-8376, published Jun. 5, 2008.*
"Periodic Hexagonal Mesostructured Chalcogenides Based on Platinum . . . " by. P. N. Trikalitis et al., J. Am. Chem. Soc., vol. 127 No. 11, pp. 3910-3920, Feb. 23, 2005.*
"Single-Crystal Mesostructured Semiconductors with Cubic . . . " by P. N. Trikalitis et al., J. Am. Chem. Soc., vol. 124 No. 41, pp. 12255-12260, Sep. 24, 2002.*

* cited by examiner

*Primary Examiner*—Timothy C Vanoy
(74) *Attorney, Agent, or Firm*—Reinhart Boerner Van Deuren, s.c.

(57) ABSTRACT

Soluble chalcogenido clusters together with transition metal ions and main group elements are shown to provide gels having interconnected, open frameworks. Following supercritical drying with liquid carbon dioxide, the chalcogels may be converted to aerogels. The aerogels possess high internal surface areas with a broad pore size distribution that is dependent upon the precursors used and the aging conditions applied. Some of the gels are encompassed by formulas such as $M_4[M'_4Q_x]_n$, $M_4[M'_2Q_y]_n$, $M_4[M'Q_x]_n$, $M_3[M''Q_x]_n$, or $Me_2[M'''Q_x]_n$, where M is a divalent, trivalent, or tetravalent metal ion; M', M'', and M''' are typically Ge, Sn, P, As, Sb, Mo, or W; and Q is typically S, Se, or Te. Methods of preparing the chalcogenido clusters are also provided.

15 Claims, 2 Drawing Sheets

SEMICONDUCTING AEROGELS FROM CAHACOGENIDO CLUSTERS WITH BROAD APPLICATIONS

CROSS-REFERENCE TO RELATED APPLICATIONS

This application claims the priority to U.S. Provisional Application No. 60/892,908, filed Mar. 5, 2007, the entire content of which is incorporated herein by reference.

FIELD

The present invention is generally directed to new chalcogenide cluster compounds. More specifically, the compounds are hydrogel or aerogel chalcogenide cluster compounds with linking metal atoms. Methods for the preparation of the compounds are also provided.

BACKGROUND

Inorganic porous materials are at the foundation of broad applications such as molecular sieves, ion exchangers and catalysts. Zeolites and aluminosilicate mesoporous materials constitute the vast majority of the materials in this class. Aerogels are another kind of porous inorganic polymer in which nano-sized blocks are interconnected to yield high internal surface areas, low densities, and large open pores. Although the sol-gel chemistry of oxide-based materials (e.g., $SiO_2$, $Al_2O_3$ and $TiO_2$, etc.) is well known, successful attempts to apply this approach to non-oxide-based systems, especially to chalcogenides, are quite rare. Such systems would be capable of combining the electronic properties of chalcogenides with internal porosity, which could lead to new fields of study.

SUMMARY

In one aspect, a strategy is provided to create highly porous semiconducting aerogels derived from chalcogenide-based clusters and linking metal ions. The chalcogenide compounds have the formula $M_i[M'_yQ_x]_n$, $M_i[M''_yQ_x]_n$, or $Me_i[M'''_yQ_x]_n$, wherein M is selected from $Zn^{2+}$, $Cd^{2+}$, $Fe^{2+}$, $Mn^{2+}$, $Mg^{2+}$, $Pt^{2+}$, $Pd^{2+}$ $Sb^{3+}$, $Ga^{3+}$, $In^{3+}$, $Al^{3+}$, $Bi^{3+}$, $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, $Sn^{4+}$, $Ti^{4+}$, $Ge^{4+}$, $Zr^{4+}$, $V^{4+}$, $Te^{4+}$, or a mixture of any two or more thereof; M' is selected from Sn, Ge, or a mixture thereof; M" is selected from P, As, Sb, or a mixture of any two or more thereof; M''' is selected from Mo, W, or a mixture of any two or more thereof; Me is selected from $Ni^{2+}$, $Co^{2+}$, $Zn^{2+}$, $Cd^{2+}$, $Fe^{2+}$, $Mn^{2+}$, $Mg^{2+}$, $Pt^{2+}$, $Pd^{2+}$, $Sb^{3+}$, $Ga^{3+}$, $In^{3+}$, $Al^{3+}$, $Bi^{3+}$, $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, $Sn^{4+}$, $Ti^{4+}$, $Ge^{4+}$, $Zr^{4+}$, $V^{4+}$, $Te^{4+}$, or a mixture of any two or more thereof; Q is selected from S, Se, Te, or a mixture of any two or more thereof; and $1 \leq i \leq 4$; $1 \leq n \leq 4$; $2 \leq x \leq 12$; and $0.05 \leq y \leq 5$. In some embodiments, the compound is a hydrogel. In other embodiments, the compound is an aerogel.

In some embodiments, the compound has the formula $M_4[M'_4Q_x]_n$, $M_4[M'_2; Q_y]_n$, $M_4[M'Q_x]_n$, $M_3[M''Q_x]_n$, or $Me_2[M'''Q_x]_n$. For example, in some embodiments, the compound is $Pt_{2.0}Ge_4S_{9.6}$, $Pt_{2.0}Ge_4Se_{8.7}$, $Pt_{2.7}Sn_4Se_{9.7}$, $Pt_{1.8}Sn_2Se_{5.7}$, $Pt_{2.0}SnSe_{4.0}$, $Pt_{1.8}SnS_{4.0}$, or $Pt_{1.8}Ge_2Se_{6.3}$.

In some embodiments, the aerogel has a pore size of greater than about 1 nm; greater than about 10 nm; greater than about 50 nm; or greater than about 100 nm. In other embodiments, the aerogel has a pore size of from about 1 nm to about 200 nm; from about 1 nm to about 100 nm; from about 2 nm to about 100 nm; or from about 2 nm to about 50 nm. In other embodiments, the aerogel has a Brunauer Emmett Teller surface area of from about $10 \, m^2/g$ to about $500 \, m^2/g$; from about $50 \, m^2/g$ to about $400 \, m^2/g$; or from about $100 \, m^2/g$ to about $400 \, m^2/g$. In yet other embodiments, the aerogel has a silica equivalence Brunauer Emmett Teller surface area of about $100 \, m^2/g$ to about $1600 \, m^2/g$; from about $100 \, m^2/g$ to about $1200 \, m^2/g$; from about $200 \, m^2/g$ to about $1000 \, m^2/g$; from about $300 \, m^2/g$ to about $800 \, m^2/g$; from about $400 \, m^2/g$ to about $700 \, m^2/g$; or from about $450 \, m^2/g$ to about $650 \, m^2/g$.

In some embodiments, the compounds are semiconducting.

In another aspect, a method of preparing a compound of $M_i[M'_yQ_x]_n$, $M_i[M''_yQ_x]_n$ or $Me_i[M'''_yQ_x]_n$, is provided, comprising metathesizing a compound of formula $(NR_4)_4$ $[M'_4Q_{10}]$, $A_4[M'_2Q_6]$, or $A_4[M'Q_4]$ in the presence of a metal salt in an aqueous solution to form a hydrogel, wherein R is a straight or branched chain alkyl group having from 1-10 carbon atoms, a straight or branched chain alkenyl group having from 1-10 carbon atoms, a straight or branched chain alkynyl group having from 1-10 carbon atoms, a cycloalkyl group having from 1-10 carbon atoms, or an aryl group having from 1-10 carbon atoms; A is an alkali metal; M is selected from $Zn^{2+}$, $Cd^{2+}$, $Fe^{2+}$, $Mn^{2+}$, $Mg^{2+}$, $Pt^{2+}$, $Pd^{2+}$, $Sb^{3+}$, $Ga^{3+}$, $In^{3+}$, $Al^{3+}$, $Bi^{3+}$, $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, $Sn^{4+}$, $Ti^{4+}$, $Ge^{4+}$, $Zr^{4+}$, $V^{4+}$, $Te^{4+}$, or a mixture of any two or more thereof; M' is selected from Sn Ge, or a mixture thereof; M" is selected from P, As, Sb, or a mixture of any two or more thereof; M''' is selected from Mo, W, or a mixture of any two or more thereof; Me is selected from $Ni^{2+}$, $Co^{2+}$, $Zn^{2+}$, $Cd^{2+}$, $Fe^{2+}$, $Mn^{2+}$, $Mg^{2+}$, $Pt^{2+}$, $Pd^{2+}$, $Sb^{3+}$, $Ga^{3+}$, $In^{3+}$, $Al^{3+}$, or $Bi^{3+}$; Q is selected from S, Se, Te, or a mixture of any two or more thereof; and $1 \leq i \leq 4$; $1 \leq n \leq 4$; $2 \leq x \leq 12$; and $0.05 \leq y \leq 5$.

In some embodiments, R is selected from methyl, ethyl, n-propyl, iso-propyl, n-butyl, sec-butyl, iso-butyl, tert-butyl, pentyl, iso-pentyl, neo-pentyl, hexyl, phenyl, or naphthyl. In other embodiments, A is selected from Li, Na, or K. In yet other embodiments, the metal salt is $MX_n$, where X is F, Cl, Br, or I and n is 1, 2, 3, or 4.

In some embodiments, the method further comprises supercritically drying the hydrogel to form an aerogel.

DETAILED DESCRIPTION

Figure 1:
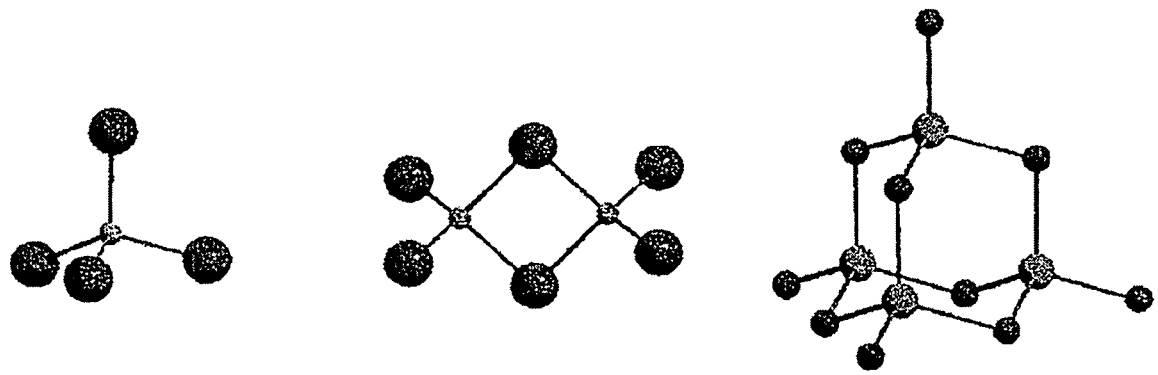
FIG. 1 shows pictures of models of the building blocks of chalcogenide hydrogels, according to one embodiment.

A number of soluble chalcogenido clusters, together with transition metal ions and main group elements, are capable of producing gels having interconnected, open frameworks. Because these gels are formed from a chalcogenide cluster, they are termed 'chalcogels.' Following supercritical drying with liquid carbon dioxide, the chalcogels may be converted to aerogels. The aerogels possess high internal surface areas, with a broad pore size distribution that is dependent upon the precursors used and the aging conditions applied. The aerogels also exhibit narrow energy gaps, or band gaps, in the range of 0.2-2.0 eV depending on the chalcogenido cluster. These aerogels are of interest for a broad range of applications such as, but not limited to, catalysts for use in photosynthetic and photocatalytic investigations; environmental remediation including, but not limited to, heavy metal adsorption, organic pollutant removal from water, and detoxification of water; solid state sensor devices for use in optoelectronics and sensing investigations; separation membranes for gas separation; and a broad range of other uses. Also, provided are methods for the preparation of such compounds, and for the preparation of highly porous semiconducting aerogels derived from chalcogenide-based clusters with platinum as the linking metal ion.

It is very difficult to remove surfactants from mesostructured materials made from chalcogenide-based Zintl building blocks. The strategy reported here represents the first report of a method for making porous materials with chalcogenide-based clusters. The methods provided are generally applicable to the formation of chalcogenide aerogels, due to the availability of a large number of soluble chalcogenido clusters together with various linking transition metal ions and main group metal ions.

The aerogels are not based on quantum dot nanoparticles. Aerogels with quantum dot nanoparticles are materials where nanoparticles of a material are dispersed within the framework of an aerogel, such a silica-based aerogel. Such aerogels with quantum dot nanoparticles are further discussed in the following: Brock et al. *Comments on Inorganic Chemistry* 21(5-6), 103-126 (2006); Arachchige et al. *J. Am. Chem. Soc.* 128(24), 7964-7971 (2006); and Mohanan et al. *Science* 307 (5708) 379-400 (2005).

The areogels embodied herein present continuous frameworks with optical properties spanning the infrared through the visible regions of the electromagnetic spectrum, and the optical features of each chalcogel can be effectively tuned over a substantial range by adjusting the chalcogenide precursor cluster. The solution-based gelation and aerogel formation processes allow for the assembly of films from solution for a variety of experimentation and uses, including sensing, gas absorption, gas separation, catalysis, solid state devices, etc.

BET is an abbreviation for Brunauer Emmett Teller.
BJH is an abbreviation for Barrett Joynes Halenda.
EDS is an abbreviation for energy dispersive spectroscopy.
MS is an abbreviation for mass spectroscopy.
TEA is an abbreviation for tetraethyl ammonium.
TEM is an abbreviation for transmission electron microscopy.
TGA is an abbreviation for thermogravimetric analysis.
TMA is an abbreviation for tetramethyl ammonium.
PXRD is an abbreviation for powder X-ray diffraction.

As used herein, the term hydrogel refers to an insoluble network that is sometimes found as a colloidal gel in which water is used as a dispersion medium.

As used herein, the term aerogel refers to a low-density, solid-state material, derived from a gel, in which the liquid component of the gel has been replaced with gas.

In general, "substituted" refers to an organic group, such as an alkyl group, in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; diamines; imides; isocyanates; isothiocyanates; cyanates; thiocyanates; imines; nitro groups; nitriles (i.e., CN); and the like.

As used herein, the term "alkyl" includes straight chain and branched alkyl groups. For example, alkyl groups may have from 1 to about 20 carbon atoms. Alkyl groups may further include cycloalkyl groups. Examples of straight chain alkyl groups include those with from 1 to 20 carbon atoms such as methyl, ethyl, n-propyl, n-butyl, n-pentyl, n-hexyl, n-heptyl, n-octyl, n-nonyl, n-decyl groups, and the like. Examples of branched alkyl groups include, but are not limited to, isopropyl, iso-butyl, sec-butyl, tert-butyl, neopentyl, isopentyl, 2,2-dimethylpropyl groups, and the like. Representative substituted alkyl groups may be substituted one or more times with substituents.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 12 ring members, whereas in other embodiments the number of ring carbon atoms range from 3 to 5, 3 to 6, or 3 to 7. Cycloalkyl groups further include mono-, bicyclic and polycyclic ring systems, such as, for example bridged cycloalkyl groups as described below, and fused rings, such as, but not limited to, decalinyl, and the like. In some embodiments, polycyclic cycloalkyl groups have three rings. Substituted cycloalkyl groups may be substituted one or more times with, non-hydrogen and non-carbon groups as defined above. Substituted cycloalkyl groups may also include epoxy groups. However, substituted cycloalkyl groups also include rings that are substituted with straight or branched chain alkyl groups as defined above. Representative substituted cycloalkyl groups may be mono-substituted or substituted more than once, such as, but not limited to, 2,2-, 2,3-, 2,4-2,5- or 2,6-disubstituted cyclohexyl groups, which may be substituted with substituents such as those listed above.

Alkenyl groups include straight and branched chain alkyl and cycloalkyl groups as defined above, except that at least one double bond exists between two carbon atoms. Thus, alkenyl groups may have from 2 to about 20 carbon atoms, and typically from 2 to 12 carbons or, in some embodiments, from 2 to 8, 2 to 6, or 2 to 4 carbon atoms. In some embodiments, alkenyl groups include cycloalkenyl groups having from 4 to 20 carbon atoms, 5 to 20 carbon atoms, 5 to 10 carbon atoms, or even 5, 6, 7, or 8 carbon atoms. Examples include, but are not limited to vinyl, allyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, hexadienyl, norbornenyl, among others. Representative substituted alkenyl groups may be mono-substituted or substituted more than once, such as, but not limited to, mono-, di- or tri-substituted with substituents such as those listed above.

Aryl groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or naphthyl groups, which may be substituted with substituents such as those listed above.

Aralkyl groups are alkyl groups as defined above in which a hydrogen or carbon bond of an alkyl group is replaced with a bond to an aryl group as defined above. In some embodiments, aralkyl groups contain 7 to 20 carbon atoms, 7 to 14 carbon atoms or 7 to 10 carbon atoms. Substituted aralkyl groups may be substituted at the alkyl, the aryl or both the alkyl and aryl portions of the group. Representative aralkyl groups include but are not limited to benzyl and phenethyl groups and fused (cycloalkylaryl)alkyl groups such as 4-ethyl-indanyl. Representative substituted aralkyl groups may be substituted one or more times with substituents such as those listed above.

As used herein, and unless otherwise noted, "a" or "an" refers to one or more.

As used herein, and unless otherwise noted, "about" means within 20% of the stated value in some embodiments, and within 10% of the stated value in other embodiments.

The word "or" when used without a preceding "either" (or other similar language indicating that "or" is unequivocally meant to be exclusive—e.g., only one of x or y, etc.) shall be interpreted to be inclusive, that is "or" when it appears alone shall mean both "and" and "or." Likewise, as used herein, the term "and/or" shall also be interpreted to be inclusive in that the term shall mean both "and" and "or." In situations where "and/or" or "or" are used as a conjunction for a group of three or more items, the group should be interpreted to include one item alone, all of the items together, or any combination or number of the items.

Terms used in the specification and claims such as have, having, include, and including should be construed to be synonymous with the terms comprise and comprising.

Chalcogels may be prepared in an aqueous solution by the metathesis reaction of anionic $[M'Q_4]^{4-}$, $[M'_2Q_6]^{4-}$, and/or $[M'_4Q_{10}]^{4-}$ building blocks (FIG. 1) in the presence of metal salts, according to following reactions:

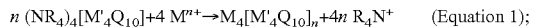  (Equation 1);

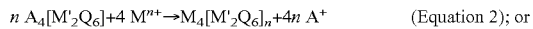  (Equation 2); or

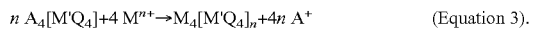  (Equation 3).

Suitable R groups include, individually, an alkyl group having from 1-20 carbon atoms, a alkenyl group having from 2-20 carbon atoms, a alkynyl group having from 2-20 carbon atoms, a cycloalkyl group having from 1-20 carbon atoms, an aryl group having from 6-14 carbon atoms, or an aralkyl group having from 7-20 carbon atoms. Exemplary alkyl groups include, but are not limited to, methyl, ethyl, n-propyl, iso-propyl, n-butyl, sec-butyl, iso-butyl, tert-butyl, pentyl, iso-pentyl, neo-pentyl, and hexyl. Exemplary aryl groups include, but are not limited to, phenyl and naphthyl. Exemplary aralkyls include, but are not limited to benzyl. A may be any alkali metal such as Li, Na, or K or an organic cation such as ammonium cations, alkylammonium cations, phosphonium ions, or hydrazinium ions. Each M is, individually, a metal ion including, but not limited to divalent, trivalent, and tetravalent metal ions. For example, divalent metal ions may include, but are not limited to $Zn^{2+}$, $Cd^{2+}$, $Fe^{2+}$, $Mn^{2+}$, $Mg^{2+}$, $Pt^{2+}$, and $Pd^{2+}$. Trivalent metal ions may include, but are not limited to trivalent $Sb^{3+}$, $Ga^{3+}$, $In^{3+}$, $Al^{3+}$, $Bi^{3+}$, $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, and $Lu^{3+}$. Tetravalent metal ions may include, but are not limited to tetravalent $Sn^{4+}$, $Ti^{4+}$, $Ge^{4+}$, $Zr^{4+}$, $V^{4+}$, and $Te^{4+}$. Each M' is individually Sn or Ge. Each Q is S, Se, or Te.

Chalcogenide gels may also be prepared via a metathesis reaction in an aqueous solution with anionic $[M''Q'_4]^{3-}$, $[M''Q_3]^{3-}$, and $[P_2Q_6]^{4-}$ building blocks in the presence of metal salts. In such formulas, M'' is P, As, or Sb; Q is S, Se, or Te; and Q' is S or Se. The preparation of this family of chalcogenide gels may be illustrated as shown in equation 4.

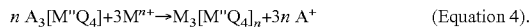  (Equation 4).

A, M, and M' are defined as above.

Chalcogenide gels may also be prepared via a metathesis reaction in an aqueous solution with anionic $[M'''Q_4]^{2-}$ building blocks in the presence of metal salts. Where M''' is Mo or W, and Q is as defined above. The preparation of this family of chalcogenide gels may be illustrated as shown in equation 5.

  (Equation 5).

A and M''' are as defined above, and Me is a divalent metal ion such as, but not limited to, $Ni^{2+}$, $Co^{2+}$, $Zn^{2+}$, $Cd^{2+}$, $Fe^{2+}$, $Mn^{2+}$, $Mg^{2+}$, $Pt^{2+}$, and $Pd^{2+}$; or a trivalent metal ion such as, but not limited to, $Sb^{3+}$, $Ga^{3+}$, $In^{3+}$, $Al^{3+}$, or $Bi^{3+}$. An example where Me=$Pt^{2+}$ is described in detail below.

In the metathesis reactions, illustrated in equations 1, 2, and 3, M is bound to the Q terminal atoms of chalcogenido clusters having the stated general formulas. For example, in equation 1, where M is a $Pt^{2+}$ ion, the material has the general formula $Pt_2[M'_4Q_{10}]$, and EDS study revealed that two platinum atoms are associated with each complex anion in most instances, thereby giving a charge-balanced formula (Table 1). Potassium or chloride ions, used as counterions in the synthesis, were not detected in the product. Such an observation is consistent with complete metathesis. These linking/polymerization reactions produce a continuous, extended framework of M-M'-Q covalently bonded atoms that encapsulate solvent molecules during the polymerization (i.e. gellation) process for the production of the hydrogels.

TABLE 1

Elemental analysis, color and band gap data for a chalcogel-N series.

| Chalcogel | Zintl Anion | Pt:M:Q | Empirical | Color | Band gap (eV) |
|---|---|---|---|---|---|
| Chalcogel-1 | $[Ge_4S_{10}]^{4-}$ | 2.0:4:9.6 | $Pt_{2.0}Ge_4S_{9.6}$ | Pinkish-brown | 2.0 |
| Chalcogel-2 | $[Ge_4Se_{10}]^{4-}$ | 2.0:4:8.7 | $Pt_{2.0}Ge_4Se_{8.7}$ | Black | 1.3 |
| Chalcogel-3 | $[Sn_4Se_{10}]^{4-}$ | 2.1:4:9.7 | $Pt_{2.7}Sn_4Se_{9.7}$ | Black | 1.0 |
| Chalcogel-4 | $[Sn_2Se_6]^{4-}$ | 1.8:2:5.7 | $Pt_{1.8}Sn_2Se_{5.7}$ | Black | 0.8 |
| Chalcogel-5 | $[SnSe_4]^{4-}$ | 2.0:1:4.0 | $Pt_{2.0}SnSe_{4.0}$ | Black | 0.2 |

TABLE 1-continued

Elemental analysis, color and band gap data for a chalcogel-N series.

| Chalcogel | Zintl Anion | Pt:M:Q | Empirical | Color | Band gap (eV) |
|---|---|---|---|---|---|
| Chalcogel-6 | $[SnS_4]^{4-}$ | 1.4:1:4.0 | $Pt_{1.4}SnS_{4.0}$ | Dark pinkish brown | 1.4 |
| Chalcogel-7 | $[Ge_2Se_6]^{4-}$ | 1.8:2:6.3 | $Pt_{1.8}Ge_2Se_{6.3}$ | Black | 0.8 |

*Based on EDS results. Semi-quantitative microprobe analyses were performed on a JEOL JSM-6400 SEM equipped with a Noran EDS system. Data acquisition was performed several times in different areas of the samples using an accelerating voltage of 25 kV and 60-s accumulation time. Listed values are an average of seven measurements on independently prepared samples.

After supercritical drying with liquid $CO_2$, the chalcogels in Table 1 yield highly porous aerogels. All samples show consistent Pt/M/Q (M=Ge, Sn; Q=S, Se) ratios very close to those in the starting clusters. However, slight discrepancies were observed for chalcogel-3 and chalcogel-6. Without being bound by theory, such discrepancies may be attributed to solution equilibrium processes. A 2:1 molar ratio of platinum to chalcogenide cluster was used in all cases for the preparation of the chalcogels. However, for chalcogels 3 and 6, the platinum content was approximately 2.7 and 1.4, respectively.

Figure 3:
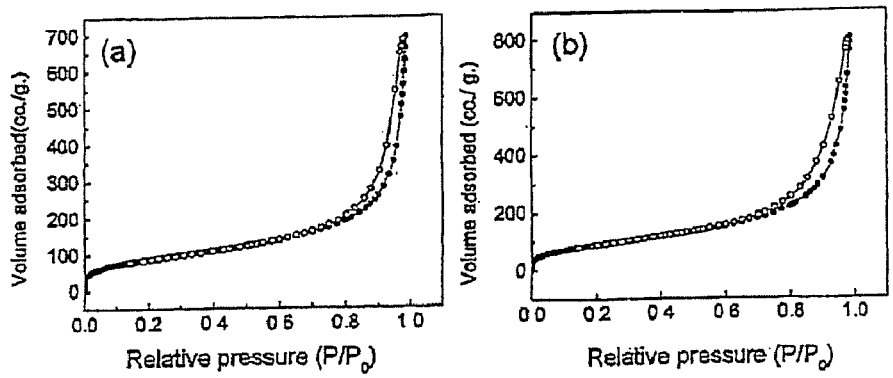
FIG. 3 illustrates nitrogen adsorption-desorption isothermal graphs for (a) chalcogel-1 and (b) chalcogel-2 at 77° K. Adsorption data are illustrated by the filled circles, while desorption data are illustrated by the open circles. All samples were degassed overnight at 75° C. prior to analysis.

TEM images of these aerogels were recorded and show empty mesopores with no long range order. These chalcogels appear to be morphologically similar to the silica aerogels where particles are connected to each other, forming continuous amorphous networks. The mesoporosity was confirmed by nitrogen physisorption measurements. The adsorption-desorption isotherms show a type IV adsorption branch with a combination of H1 and H3-type hysteresis loop, characteristic of an interconnected mesoporous system (FIG. 3). This indicates that the mesopores possess cylindrical and slit-shape geometries. Pore size distribution plots calculated by the BJH method from the desorption branch suggest the presence of a broad range of pore sizes in the meso region. Additionally, the absence of saturation in the adsorption isotherm implies the simultaneous presence of macropores in the samples. Such observations are consistent with the aerogel nature of the chalcogenides. In some embodiments, macropores have a pore diameter greater than or equal to 50 nm. A comparison of the gels before and after supercritical drying shows very little volume loss upon drying.

As noted, TEM samples were recorded after preparation by suspending the aerogel sample in ether and then casting on a carbon grid. High resolution TEM images were obtained with a JEOL 2200FS instrument (field emission) operating at 200 kV.

Figure 2:
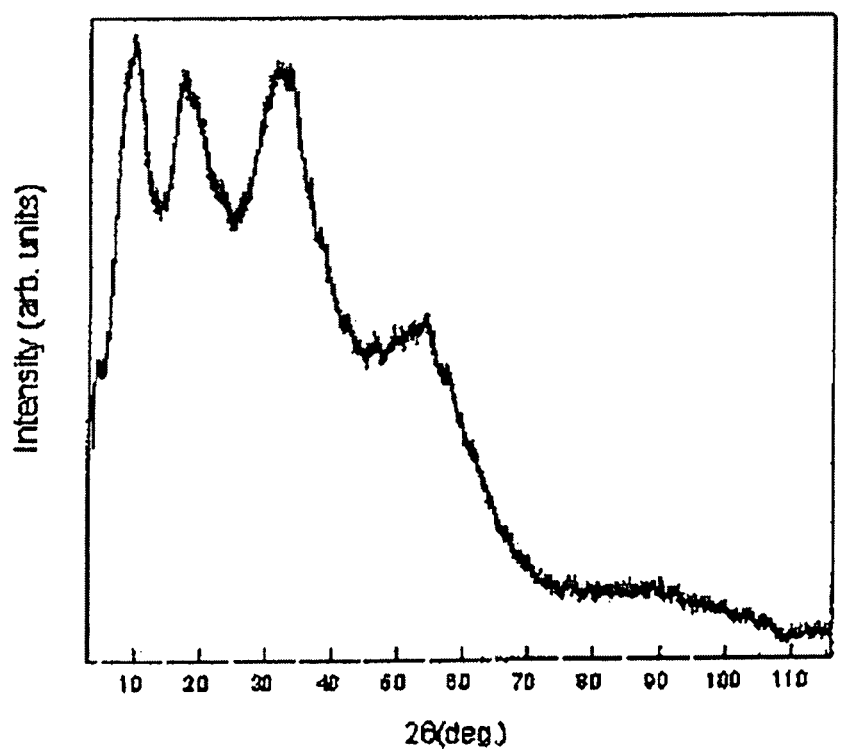
FIG. 2 shows a powder XRD pattern for dried chalcogels according to various embodiments.

PXRD data were collected on an Inel CPS 120 powder diffractometer (40 kV, 20 mA) with a graphite monochromatized Cu Kα radiation in asymmetric reflection mode. FIG. 2 shows large-angle PXRD data for chalcogel-1. The amorphous nature of the aerogel and the lack of crystalline phases is readily apparent from the graph.

BET surface areas determined for the aerogels range from about 108 $m^2/g$ to about 327 $m^2/g$, depending upon the chalcogenido cluster used (Table 2). The surface area of about 327 $m^2/g$ obtained from $[Ge_4Se_{10}]^{4-}$ is the highest in the Chalcogel-N (N=1-7) series, followed by about 323 $m^2/g$ in the case of $[Ge_4S_{10}]^{4-}$. The smallest cluster $[SnS_4]^{4-}$ gave the lowest BET surface area value of about 108 $m^2/g$ to about 117 $m^2/g$.

Given that the formula weights of these chalcogels are high, on a per-mole basis the surface area values are very large. Values computed by converting the BET surface areas for 1 mol of chalcogel into those for a mol of silica using the respective formula weights, called 'silica equivalence surface areas,' are among the highest known for any porous system. The silica equivalence BET surface area of chalcogel-2 is about 1674 $m^2/g$ and that of chalcogel-3 is about 1580 $m^2/g$. The silica equivalent surface area values for the aerogels range from about 100 $m^2/g$ to about 1600 $m^2/g$; from about 100 $m^2/g$ to about 1200 $m^2/g$; from about 200 $m^2/g$ to about 1000 $m^2/g$; from about 300 $m^2/g$ to about 800 $m^2/g$; from about 400 $m^2/g$ to about 700 $m^2/g$; or from about 450 $m^2/g$ to about 650 $m^2/g$. Some aerogels have silica equivalence BET surface area of about 600 $m^2/g$.

TABLE 2

Nitrogen adsorption/desorption data for Chalcogel-N series

| Chalcogel-N | BET Surface Area $(m^2/g)$* | Surface Area, silica equivalence $(m^2/g)$† | Adsorption total pore volume $(cm^3/g)$# |
|---|---|---|---|
| Chalcogel-1 | 276-323 | 1012-1184 | 0.59-0.73 |
| Chalcogel-2 | 282-327 | 1444-1674 | 0.54-0.85 |
| Chalcogel-3 | 196-271 | 1143-1580 | 0.52-0.70 |
| Chalcogel-4 | 225-229 | 1296-1319 | 0.48-0.52 |
| Chalcogel-5 | 210-211 | 1441-1448 | 0.44-0.48 |
| Chalcogel-6 | 108-117 | 467-506 | 0.21-0.23 |
| Chalcogel-7 | 227-249 | 1305-1432 | 0.58-0.60 |

*Three independently prepared samples were measured at 77° K on a Micromeritics ASAP 2010 system and the closest ones were listed. For each measurement, about 200 mg of samples were taken. Before measurement, samples were degassed overnight at 348° K under vacuum (<$10^{-4}$ mbar).
†The molecular formula were normalized to two sulfur/selenium atoms to compare well with $SiO_2$ (e.g., $Pt_2Ge_4S_{10}$ is converted to $Pt_{0.4}Ge_{0.8}S_2$ having formula weight of 220.26 g/mol) for equivalent surface area calculation.
Single-point adsorption total pore volume was calculated at relative pressure (P/$P_0$) of 0.97.

The chalcogels showed a remarkably high capacity for detoxifying contaminated water of heavy metals. Starting with 150 ppm $Hg^{2+}$ contaminated water, these systems (12 mg each of chalcogel) were capable of removing $Hg^{2+}$, such that the final $Hg^{2+}$ concentration was below 0.1 ppm. For example, 10 mg of chalcogel-1 reduced the 645 ppm $Hg^{2+}$ solution to 0.04 ppm $Hg^{2+}$ after the solution was stirred overnight at room temperature. The specific binding of chalcogels with heavy metals was demonstrated by adding 5 ml each of $Zn^{2+}$ (89 ppm) and $Hg^{2+}$ (92 ppm) solutions to 10 mg chalcogel-2 and stirring at room temperature for 24 hours. The final solution contained 52.8 ppm $Zn^{2+}$ and 0.1 ppm $Hg^{2+}$. Whereas mesoporous silicates need to be functionalized with surface modified thiolate ligands before use in environmental remediation, the chalcogels work directly as potential heavy metal adsorbents without prior modification of their surface. The chalcogels also efficiently absorb organic aromatic molecules from solution. As a demonstration, chalcogel-1 was able to absorb almost the entire content of porphyrin I from a 5.67 $\mu molL^{-1}$ ethanolic solution within 24 h (30 mg of chalcogel-1 was shaken continuously in 16 ml of the porphyrin solution).

In some embodiments, the chalcogels absorb light in the visible and infrared regions of the spectrum. Such absorptions exhibit sharp energy gaps from 2.0 eV to 0.8 eV (Table 1) as determined by diffuse-reflectance solid-state ultraviolet-visible/near-infrared spectroscopy (FIG. 4a). Only chalcogel-5 showed a broad band gap of 0.2 eV in the infrared region. The optical properties of the highly porous semiconducting aerogels can be tuned by changing the building block. Going from the S to Se analogues of the adamantane cluster, the energy gap decreases as expected. Also, by changing the group IV metal in the cluster from Ge to Sn, the energy gap is decreased by 0.3 eV. Similarly, the band gap can be changed by varying the chalcogenide content per metal in the starting clusters. This is reflected in the observed band gaps of chalcogels 3, 4, and 5, where the Se content per Sn atom is increased gradually with a concomitant narrowing of the energy gap, or band gap.

Figure 4:
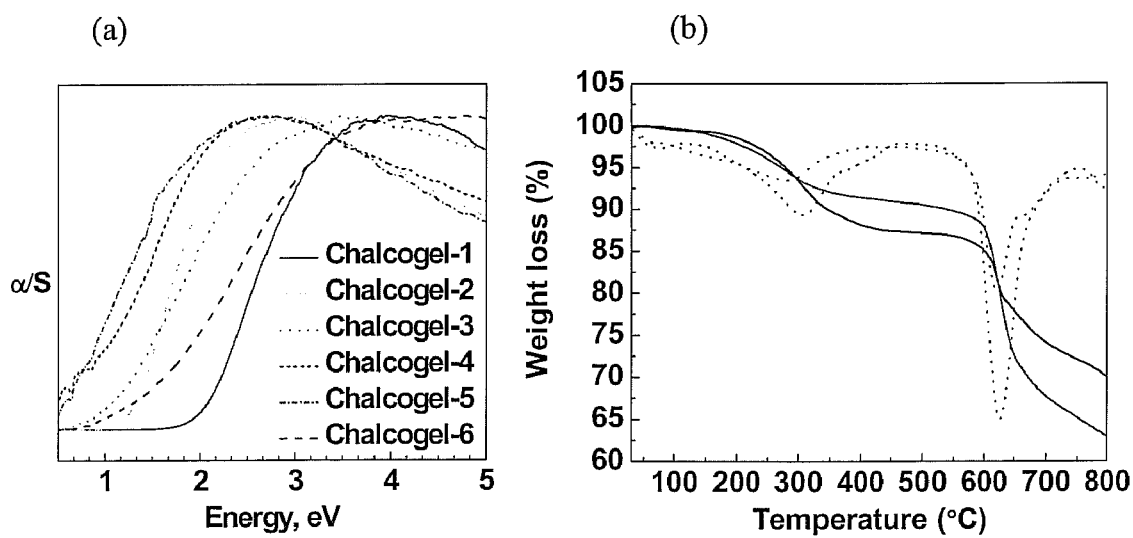
FIG. 4 illustrates (a) optical absorption spectra and (b) thermogravimetric data for exemplary chalcogels.

As described above, FIG. 4 illustrates (a) optical absorption spectra and (b) thermogravimetric data for exemplary chalcogels. FIG. 4a shows UV-Vis diffuse reflectance spectra of chalcogel-N, where N represents various chalcogel species. UV-Vis diffuse reflectance spectra were recorded at room temperature with a Shimadzu model UV-3101PC double-beam, double-monochromator spectrometer in the wavelength range of 200-2,500 nm, using powder $BaSO_4$ as a 100% reflectance standard. Reflectance data were converted to adsorption ($\alpha/S$) data according to the Kubelka-Munk equation: $(\alpha/S)=(1-R)^2/(2R)$, where R is the reflectance, $\alpha$ is the adsorption coefficient, and S is the scattering coefficient. FIG. 4b shows TGA curves of chalcogel-1 (black line) and chalcogel-2 (red line) under a nitrogen flow. A heating rate of 10° C./min was used. The data were obtained with a Shimadzu TGA-50 thermal analyzer. The temperatures of weight loss are indicated in the corresponding differential thermogravimetric (DTG) curves (dotted line).

The thermal stability of these aerogels was investigated via TGA and pyrolysis MS. In the TGA analysis, chalcogel-1 began to lose weight above about 180° C. The weight loss was gradual up to about 600° C., at which point the loss became rapid. From room temperature to about 180° C., a small 2% weight loss was observed. Without being bound by theory, this weight loss is likely due to physisorbed or chemisorbed water or ethanol (FIG. 4b). A 13% weight loss was observed from about 180° C. to about 440° C. The observed weight loss may be accounted for by the loss of four sulfur atoms. The residue at this temperature is still amorphous. Both chalcogel-1 and chalcogel-2 again start losing weight above about 540° C., and the residue at 650° C. is amorphous with partially crystalline platinum germanium sulfide or selenide (Pt-GeSe). Other chalcogels showed similar thermal behavior.

Combinations of a variety of chalcogenide clusters, together with various linking transition and main group metal ions, provides the basis for a broad class of these systems. By modifying the environment of linking metal salt (e.g., attached ligand) and reaction conditions (e.g. changing the solvent, the pH, or adding an external chelator ligand), a large number of semiconducting aerogel systems can be made using the present methods. For example, the reaction of $K_4Ge_4Te_{10}$ with $K_2PtCl_4$ in water results immediate precipitation, however, by changing the solvent from water to formamide, a black monolithic gel and an aerogel with BET surface area ranging from 157 to 162 $m^2/g$, is prepared. As another example, ammonium molybdenum sulfide, $(NH_4)_2MoS_4$, can be used in formamide solvent to form a gel with linking metal ion $Ni^{2+}$ or $Co^{2+}$ or a combination of both. These gels, important hydrodesulfurization catalysts, exhibit BET surface areas of about 350, 340 and 528 $m^2/g$ respectively after supercritical drying. Aerogels obtained by using $Co^{2+}$ linking metal ion and a combination of $(NH_4)_2WS_4$ and $(NH_4)_2MoS_4$ also possess very high BET surface area of 417 $m^2/g$.

Similarly, by simultaneously attaching a tartrate ($^-O_2CCH(OH)CH(OH)CO_2^-$) ligand to $Sb^{3+}$ and using formamide as the solvent, thereby slowing the reaction rate, an aerogel can be formed with chalcogenido clusters. For example, the reaction of $Na_4SnS_4.14H_2O$ with $K_2(C_4H_2O_6Sb)_2.3H_2O$ in formamide forms a gel, which after supercritical drying, exhibits a BET surface area of about 240 $m^2/g$. Similar reactions of $K_2(C_4H_2O_6Sb)_2.3H_2O$ with other molecular building blocks such as $[SnSe_4]^{4-}$, $[Sn_2Se_6]^{4-}$, $[Ge_4Te_{10}]^{4-}$ and $[SbSe_4]^{3-}$ in formamide also yield monolithic black gels and aerogels with respective BET surface areas of 114, 200, 176 and 127 $m^2/g$. Other main group metal ions, such as $Sn^{2+}$, form gels with $[Sn_2S_6]^{4-}$ in formamide. The BET surface area obtained from such an exemplary aerogel was about 216 $m^2/g$. High internal surface area, tuneable optical properties, and the presence of catalytic active sites (e.g. the Pt) make the chalcogels promising candidates for future investigations in photocatalysis, heavy metal absorption, and gas separation.

The present invention, thus generally described, will be understood more readily by reference to the following examples, which are merely provided by way of illustration.

EXAMPLES

Methods $(TMA)_4Ge_4S_{10}$, $(TMA)_4Ge_4Se_{10}$, $(TEA)_4Sn_4Se_{10}$, $K_4Sn_2Se_6$, $Na_4SnS_4.14H_2O$, $K_4SnSe_4$ and $K_4Ge_2Se_6$ were used as starting materials for the cluster-building blocks, and $K_2PtCl_4$ was used as a $Pt^{2+}$ source. All selenide compounds were handled inside a glove box under a nitrogen atmosphere. Critical point drying of the chalcogels was performed in a Bal-Tec CPD 030 (Balzers) instrument.

General Procedure

Example of Pt—Ge—S Chalcogel: In a typical preparation, $(TMA)_4Ge_4S_{10}$ (0.09 g, 0.1 mmol) was dissolved in water (3 ml) in a vial. In another vial, $K_2PtCl_4$ (0.08 g, 0.2 mmol) was also dissolved in water (2 ml). The two solutions were then combined and poured onto a plastic Petri dish, which was then covered and then left undisturbed for a couple of days, during which time the solution gelled. The original pink-brown solution turned to a dark pink-brown gel. Ethanol was added to the Petri dish to age the gel. During this aging, the hydrogel attained sufficient mechanical stability to be washed with water, thus removing the KCl from the gel. After several washings with water, ethanol was added and decanted 4 to 5 times over a period of 2 days. The wet gel was cut into small pieces with a razor blade and stacked into a critical-point drying bracket, which was subsequently placed into a critical-point drying chamber for supercritical drying. After supercritical drying, aerogels were obtained in a greater than 90% yield.

Similar procedures were applied to the other chalcogel systems. The only exception was the total volume of added water. For $(TMA)_4Ge_4Se_{10}$ and $K_4SnSe_4$, the total volume of added water was 8 ml each; for $(TEA)_4Sn_4Se_{10}$ and $K_4Sn_2Se_6$, the total volume of added water was 10 ml each; and for $Na_4SnS_4.14H_2O$, the total volume of added water was 4 ml.

Example of Sb—Sn—S Chalcogel: A gel using antimony as the linking metal was prepared in formamide. $Na_4SnS_4.14H_2O$ (0.059 g, 0.1 mmol) and $K_2(C_4H_2O_6Sb)_2.3H_2O$ (0.133 g, 0.2 mmol) were dissolved in hot formamide (2 ml) in separate vials with continuous shaking. The two solutions were then combined and shaken continuously for 5 minutes. During this shaking the color changed from yellow to orange, and then to deep orange-red. This solution was then poured into a plastic Petri dish, covered, and left undisturbed for one week. After several washings with water, ethanol was added and decanted 4 to 5 times over a couple of days. The resulting gel was then supercritically dried. The aerogel product was orange-brown in color.

Example of Ni—Mo—S/Co—Mo—S/Ni—Co—Mo—S/Co—Mo—W—S Chalcogels: An aerogel made from $(NH_4)_2MoS_4$ and $Ni(NO_3)_2.6H_2O$ was prepared in formamide, using a 1:1 molar ratio of building block to linking metal ion. In a typical preparation, $(NH_4)_2MoS_4$ (0.2 mmol) and $Ni(NO_3)_2.6H_2O$ (0.2 mmol) were separately dissolved in formamide (2 ml) and shaken well. The nickel nitrate solution was then added slowly to the ammonium tetrathiomolybdate solution. The dark red solution of $(NH_4)_2MoS_4$ turned black upon addition of the pale green solution of $Ni(NO_3)_2.6H_2O$. The resulting solution was shaken and then stored in a covered plastic Petri dish for aging. After a couple of weeks, the black gel was washed several times with water and ethanol, and placed in the supercritical drier. In the supercritical drier, the sample was soaked with liquid carbon dioxide and flushed 5 to 6 times over a period of 4 hours to completely remove the residual ethanol from the material. A black aerogel was obtained after supercritical drying. $CO_2$ gas should be vented off very slowly, as rapid $Co_2$ ventilation may collapse of pore structure.

Similar procedures may also be applied to other chalcogel systems. The only exception being the total volume of added solvent. For example, Co—Mo—S chalcogel was prepared using $CoCl_2.6H_2O$ (0.047 g, 0.2 mmol), $(NH_4)_2MoS_4$ (0.052 g, 0.2 mmol), and total solvent volume of 5 ml. Caution, the reaction of $CoCl_2.6H_2O$ with $MoS_4^{2-}$ is very fast. During mixing of the two precursor solutions, prolonged shaking was avoided. For the preparation of Ni—Co—Mo—S chalcogel, $Ni(NO_3)_2.6H_2O$ (0.2 mmol) and $CoCl_2.6H_2O$ (0.2 mmol) were dissolved in a total 5 ml of formamide, and then added to $(NH_4)_2MoS_4$ (0.4 mmol) dissolved in 5 ml of formamide. Co—Mo—W—S Chalcogel was prepared by dissolving each of $(NH_4)_2MoS_4$ (0.2 mmol) and $(NH_4)_2WS_4$ (0.2 mmol) in a total 5 ml of formamide, and then adding $CoCl_2.6H_2O$ (0.4 mmol) dissolved in 5 ml of formamide.

Example of Sn—S Chalcogel: Chalcogel containing an Sn—S backbone was prepared from $Na_4Sn_2S_6.14H_2O$ and tin (II) acetate salt. $Na_4Sn_2S_6.14H_2O$ (0.2 mmol) and tin (II) acetate (0.4 mmol) were dissolved in a total 8 ml of formamide in two separate vials. The tin (II) acetate solution was added very slowly to the $Na_4Sn_2S_6.14H_2O$ solution, with vigorous stirring. Small colloidal like yellowish-orange particles appeared upon addition of a drop of tin (II) acetate solution, but disappeared with shaking. Addition of the Tin (II) acetate was continued with vigorous shaking. After addition of all of the tin (II) acetate solution was complete, the viscosity of the resulting solution increased rapidly. The resulting viscous solution was then poured onto a Petri dish and left undisturbed for 3 weeks. The monolithic gel was subsequently washed with water and ethanol over 3 days and finally supercritically dried with liquid carbon dioxide, resulting in the aerogel.

Example of $Fe_4S_4$—$Sn_2S_6$ Chalcogel: A gel was prepared by dissolving $(Ph_4P)_2(Fe_4S_4Cl_4)$ (0.1 mmol) in dimethylformamide (2 ml), and adding to a solution of $Na_4Sn_2S_6.14H_2O$ (0.1 mmol) formamide (9 ml) with continuous shaking. Immediately after the complete addition of the iron salt, the brownish black solution was poured into a plastic Petri dish and left undisturbed for 3 weeks during aging at room temperature. Prolonged shaking was avoided after complete addition of iron salt to prevent the formation of large particles. The resulting monolithic gel was subsequently soaked and washed with 50:50 ethanol-water mixture (by volume) for 3 times over 3 days, and then again with absolute ethanol for 3 times over 2 days. This gradual soaking and washing process results in the exchange of dimethylformamide and formamide pore liquids with ethanol. The ethanol was then removed by supercritical drying with carbon-dioxide. The resulting aerogel possesses a BET surface area of 184 $m^2/g$.

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

While several, non-limiting examples have been illustrated and described, it should be understood that changes and modifications can be made therein in accordance with ordinary skill in the art without departing from the invention in its broader aspects as defined in the following claims.

What is claimed is:

1. A compound of formula $M_i[M'_yQ_x]_n$, $M_i[M''_yQ_x]_n$, or $Me_i[M'''_yQ_x]_n$:
   wherein,
   M is selected from the group consisting of $Zn^{2+}$, $Cd^{2+}$, $Fe^{2+}$, $Mn^{2+}$, $Mg^{2+}$, $Pt^{2+}$, $Pd^{2+}$, $Sb^{3+}$, $Ga^{3+}$, $In^{3+}$, $Al^{3+}$, $Bi^{3+}$, $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, $Sn^{4+}$, $Ti^{4+}$, $Ge^{4+}$, $Zr^{4+}$, $V^{4+}$, $Te^{4+}$, and a mixture of any two or more thereof;
   M' is selected from the group consisting of Sn, Ge, and a mixture thereof;
   M" is selected from the group consisting of P, As, Sb, and a mixture of any two or more thereof;
   M'" is selected from the group consisting of Mo, W, and a mixture of any two or more thereof;
   Me is selected from the group consisting of $Ni^{2+}$, $Co^{2+}$, $Zn^{2+}$, $Cd^{2+}$, $Fe^{2+}$, $Mn^{2+}$, $Mg^{2+}$, $Pt^{2+}$, $Pd^{2+}$, $Sb^{3+}$, $Ga^{3+}$, $In^{3+}$, $Al^{3+}$, and $Bi^{3+}$;
   Q is selected from the group consisting of S, Se, Te, and a mixture of any two or more thereof;
   $1 \leq i \leq 4$;
   $1 \leq n \leq 4$;
   $2 \leq x \leq 12$; and
   $0.05 \leq y \leq 5$, wherein the compound is a hydrogel or an aerogel.

2. The compound of claim 1, wherein the compound is a hydrogel.

3. The compound of claim 1, wherein the compound is an aerogel.

4. The compound of claim 1, wherein the compound has a formula $M_4[M'_4Q_x]_n$, $M_4[M'_2Q_y]_n$, $M_4[M'Q_x]_n$, $M_3[M''Q_x]_n$, or $Me_2[M''' Q_x]_n$.

5. The compound of claim 3, wherein the aerogel has a formula $M_4[M'_4Q_x]_n$, $M_4[M'_2Q_y]_n$, $M_4[M'Q_x]_n$, $M_3[M''Q_x]_n$, or $Me[M'''Q_x]_n$.

6. The compound of claim 1, wherein the compound is $Pt_{2.0}Ge_4S_{9.6}$, $Pt_{2.0}Ge_4S_{8.7}$, $Pt_{2.7}Sn_4Se_{9.7}$, $Pt_{1.8}Sn_2Se_{5.7}$, $Pt_{2.0}SnSe_{4.0}$, or $Pt_{1.4}SnS_{4.0}$.

7. The compound of claim 3, wherein the aerogel has a pore size of greater than about 1 nm.

8. The compound of claim 3, wherein the aerogel has a pore size of from about 1 nm to about 200 nm.

9. The compound of claim 3, wherein the aerogel has a Brunauer Emmett Teller surface of from about 100 m$^2$/g to about 500 m$^2$/g.

10. The compound of claim 3, wherein the aerogel has a silica equivalence Brunauer Emmett Teller surface area of about 100 m$^2$/g to about 1600 m$^2$/g.

11. A method of preparing the compound of claim 1, comprising metathesizing a compound of formula $(NR_4)_4[M'_4Q_{10}]$, $A_4[M'_2Q_6]$, or $A_4[M'Q_4]$ in the presence of a metal salt in an aqueous solution to form a hydrogel, wherein R is a straight or branched chain alkyl group having from 1-10 carbon atoms, a straight or branched chain alkenyl group having from 1-10 carbon atoms, a straight or branched chain alkynyl group having from 1-10 carbon atoms, a cycloalkyl group having from 1-10 carbon atoms, or an aryl group having from 1-10 carbon atoms; and A is an alkali metal.

12. The method of claim 11, wherein R is selected from the group consisting of methyl, ethyl, n-propyl, iso-propyl, n-butyl, sec-butyl, iso-butyl, tert-butyl, pentyl, iso-pentyl, neo-pentyl, hexyl, phenyl, and naphthyl.

13. The method of claim 11, wherein A is selected from the group consisting of Li, Na, and K.

14. The method of claim 11, wherein the metal salt is $Mx_n$, where X is F, Cl, Br, or I and n is 1, 2, 3, or 4.

15. The method of claim 10, further comprising supercritically drying the hydrogel to form an aerogel.

\* \* \* \* \*

UNITED STATES PATENT AND TRADEMARK OFFICE
CERTIFICATE OF CORRECTION

| | | |
|---|---|---|
| PATENT NO. | : 7,727,506 B2 | |
| APPLICATION NO. | : 12/041259 | |
| DATED | : June 1, 2010 | |
| INVENTOR(S) | : Kanatzidis et al. | |

It is certified that error appears in the above-identified patent and that said Letters Patent is hereby corrected as shown below:

In the claims:

Claim 9, Column 13, Line 2:

"100 m2/g" should read --10 m2/g--

Signed and Sealed this
Fourth Day of October, 2011

David J. Kappos
*Director of the United States Patent and Trademark Office*